United States Patent
Yang et al.

(10) Patent No.: US 10,061,367 B2
(45) Date of Patent: Aug. 28, 2018

(54) MOBILE TERMINAL

(71) Applicant: LG ELECTRONICS INC., Seoul (KR)

(72) Inventors: Hyunsuk Yang, Seoul (KR); Chiyoung Kim, Seoul (KR); Seongwoo Choi, Seoul (KR); Minho Park, Seoul (KR); Sungtaek Oh, Seoul (KR); Jungyun Lee, Seoul (KR); Junhee Kim, Seoul (KR); Sanggil Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/400,945

(22) Filed: Jan. 6, 2017

(65) Prior Publication Data

US 2017/0212571 A1 Jul. 27, 2017

(30) Foreign Application Priority Data

Jan. 22, 2016 (KR) .................. 10-2016-0008208

(51) Int. Cl.
*G06F 1/26* (2006.01)
*G06F 1/16* (2006.01)
*G06F 1/18* (2006.01)

(52) U.S. Cl.
CPC ............ *G06F 1/263* (2013.01); *G06F 1/1656* (2013.01); *G06F 1/1686* (2013.01); *G06F 1/1688* (2013.01); *G06F 1/188* (2013.01)

(58) Field of Classification Search
CPC ........ G06F 1/263; G06F 1/188; G06F 1/1686; G06F 1/1688; G06F 1/1656;

(Continued)

(56) References Cited

U.S. PATENT DOCUMENTS 6,744,624 B2 * 6/2004 Siddiqui ............... G06F 1/1626
 361/679.11
8,247,103 B2 * 8/2012 Wu ..................... H01M 2/1066
 429/100

(Continued)

FOREIGN PATENT DOCUMENTS

KR 2019990037774 10/1999
KR 20030086642 11/2003

(Continued)

OTHER PUBLICATIONS

Korean Intellectual Property Office Application No. 10-2016-0008208, Notice of Allowance dated Apr. 27, 2017, 3 pages.

(Continued)

*Primary Examiner* — Steven T Sawyer
*Assistant Examiner* — Sagar Shrestha
(74) *Attorney, Agent, or Firm* — Lee, Hong, Degerman, Kang & Waimey

(57) ABSTRACT

A mobile terminal is disclosed. The mobile terminal includes a first body including a display and a battery receiving portion that is embedded in the first body and communicates with an opening positioned at an end of the first body, a second body including an inner housing coupled to a side of a battery, and a spring assembly positioned in the first body and providing an elastic force for the battery while contacting another side of the battery coupled to the inner housing. The first body and the second body are in at least one of states including a first state in which the second body is coupled to the end of the first body, and a second state in which an entire portion of the second body is spaced apart from the end of the first body.

16 Claims, 23 Drawing Sheets

(58) Field of Classification Search
CPC ............ H01M 2/1066; H01M 2220/30; H05K 5/0221; H04M 1/0262; H04M 1/0237; H04L 9/32; H04B 1/3883; H04B 1/3816
See application file for complete search history.

(56) References Cited

U.S. PATENT DOCUMENTS

| | | | | |
|---|---|---|---|---|
| 8,774,716 | B2* | 7/2014 | Chan | H04B 5/0062 235/492 |
| 2006/0046772 | A1* | 3/2006 | Lim | H04M 1/0262 455/550.1 |
| 2009/0084040 | A1* | 4/2009 | Kondo | H01M 2/1066 49/394 |
| 2010/0086840 | A1* | 4/2010 | Shao | H01M 2/1061 429/97 |
| 2012/0026656 | A1* | 2/2012 | Lee | H01M 2/1066 361/679.01 |
| 2013/0016464 | A1* | 1/2013 | Kim | H04M 1/0262 361/679.01 |
| 2013/0210501 | A1* | 8/2013 | Tseng | H04M 1/0262 455/572 |
| 2014/0065948 | A1* | 3/2014 | Huang | H05K 5/0086 455/7 |
| 2015/0237191 | A1* | 8/2015 | Moran | H04M 1/72527 455/556.1 |
| 2017/0208159 | A1* | 7/2017 | Romain | H04M 1/0262 |
| 2017/0212628 | A1* | 7/2017 | Lee | G06F 3/0416 |
| 2017/0237845 | A1* | 8/2017 | Yoo | H04M 1/7253 455/557 |

FOREIGN PATENT DOCUMENTS

| | | |
|---|---|---|
| KR | 20090034142 | 4/2009 |
| KR | 20120010922 | 2/2012 |

OTHER PUBLICATIONS

Korean Intellectual Property Office Application No. 10-2016-0008208, Office Action dated Nov. 21, 2016, 7 pages.

* cited by examiner

FIG. 23

|  | First status | Second status | Third status |
|---|---|---|---|
| First and second bodies | Full coupling | Semi-coupling | Separation |
| Connection status | Electrical connection | Electrical connection | Disconnection |
| Fastening status | First locking module :Fastening<br><br>Second locking module :Fastening | First locking module :Release<br><br>Second locking module :Fastening | First locking module :Release<br><br>Second locking module :Release |

MOBILE TERMINAL

Pursuant to 35 U.S.C. § 119(a), this application claims the benefit of earlier filing date and right of priority to Korea Patent Application No 10-2016-0008208, filed on Jan. 22, 2016, the contents of which are all hereby incorporated by reference herein in their entirety.

BACKGROUND OF THE INVENTION

Field of the Invention

The present disclosure relates to a mobile terminal. More particularly, the present disclosure relates to a mobile terminal, in which a state of first and second bodies can be changed by a spring assembly.

Discussion of the Related Art

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, taking pictures and video using a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having capturing images and video, playing music files or video, game playing, receiving broadcast, etc. Efforts are ongoing to support and increase the functionality of the mobile terminals.

Such efforts include software and hardware improvements, as well as changes and improvements in the structural components.

SUMMARY OF THE INVENTION

Accordingly, an object of the present disclosure is to address the above-described and other problems.

Another aspect of the present disclosure is to provide a mobile terminal, in which a state of first and second bodies can be changed by a spring assembly.

In one aspect, there is provided a mobile terminal including a first body including a display and a battery receiving portion that is embedded in the first body and communicates with an opening positioned at an end of the first body; a second body including an inner housing coupled to a side of a battery; and a spring assembly positioned in the first body and providing an elastic force for the battery while contacting another side of the battery coupled to the inner housing, wherein the first body and the second body are in at least one of states including a first state in which the second body is coupled to the end of the first body, and a second state in which an entire portion of the second body is spaced apart from the end of the first body.

The inner housing may include a coupling groove formed at a side of the inner housing, and a battery locking module positioned in the coupling groove and fastened to a battery coupling portion formed at the side of the battery.

The second body may further include a second circuit board, and a connector providing a conductive path between the second circuit board and a main circuit board embedded in the first body.

The battery may include a battery terminal that is positioned at the another side of the battery and supplies electric power to the first body.

The spring assembly may provide the elastic force toward the second body.

The spring assembly may include a spring housing, at least one spring in the spring housing and providing the elastic force, and a pusher connected to the at least one spring and transferring the elastic force from the at least one spring to the second body and the battery.

The mobile terminal may further include a plurality of cameras, and a camera bracket accommodating the plurality of cameras and coupled to the first body. The spring assembly may be coupled to the camera bracket and is positioned between the plurality of cameras.

The states of the first body and the second body may further include a third state in which the second body is spaced apart from the first body by the elastic force of the spring assembly. In the third state, the second body may be inclined to the end of the first body by a predetermined angle and may be spaced apart from the end of the first body.

The mobile terminal may further include an eject key positioned at a side of the first body and releasing a coupling between at least one locking module of the second body and the first body. In the third state, a separation distance between the end of the first body and the second body at the side of the first body at which the eject key is positioned, may be greater than a separation distance between the end of the first body and the second body at another side of the first body.

The mobile terminal may further include an eject key positioned at a side of the first body and releasing a coupling between at least one locking module of the second body and the first body.

The eject key may include a button and a key shaft extended from the button. The locking module may include a locking button that contacts the key shaft and moves in a longitudinal direction of the key shaft by the key shaft. When the locking button moves in the longitudinal direction of the key shaft, the state of the first body and the second body may change from the first state to the second state.

The battery may be in one of a state in which the battery and the second body are coupled and another state in which a coupling of the battery and the second body is released.

The states of the first body and the second body may further include a third state in which the second body is spaced apart from the first body by the elastic force of the spring assembly. In the first and third states, the battery and the first body may contact each other and may be in an electrically connected state.

The second body may further include an antenna pattern. At least a portion of the antenna pattern may overlap a boundary between the first body and the second body in the first state.

At least a portion of a back surface of the first body may be formed of a metal material.

The second body may further include a speaker module and an USB module.

According to at least one aspect of the present disclosure, the present disclosure can provide the mobile terminal, in which a state of the first and second bodies can be changed by the spring assembly.

Additional features and advantages of the invention will be set forth in the description which follows, and in part will be apparent from the description, or may be learned by practice of the invention. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 23 illustrates a state of a mobile terminal according to an embodiment of the invention.

DETAILED DESCRIPTION OF THE EMBODIMENTS

Figure 1:
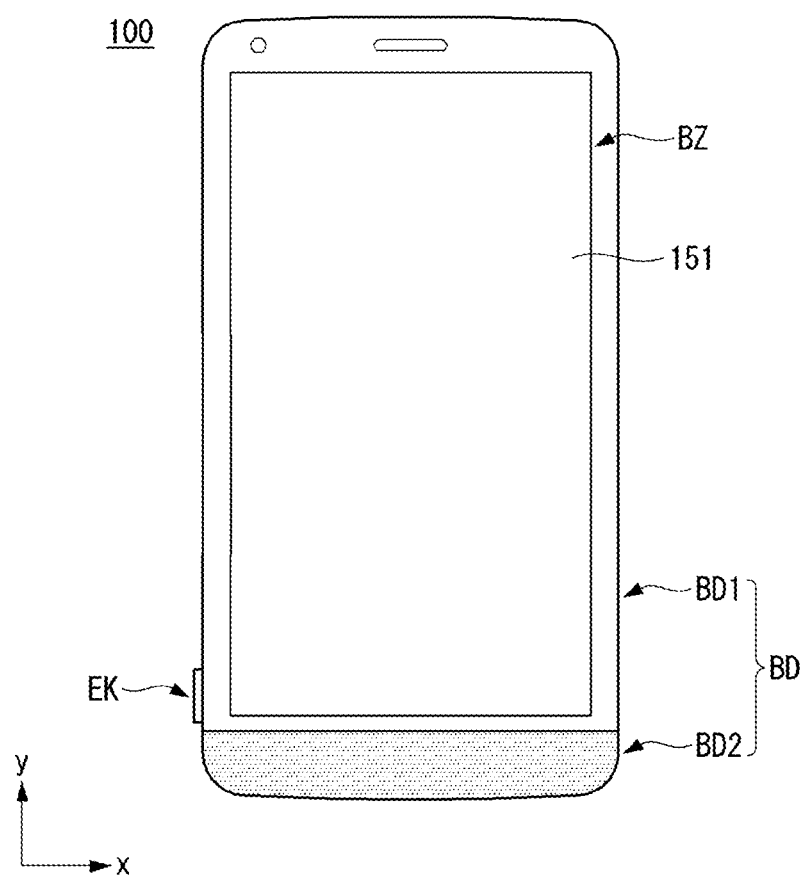
FIG. 1 illustrates a mobile terminal according to an embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Mobile terminals disclosed herein may be implemented using a variety of different types of devices. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of mobile terminals, such as those types noted above. In addition, these teachings may also be applied to stationary terminals such as digital TV, desktop computers, and the like.

FIG. 1 illustrates a mobile terminal according to an embodiment of the invention. More specifically, FIG. 1 is a front view of a mobile terminal 100 according to an embodiment of the invention.

In embodiments disclosed herein, a coordinate system is a rectangular coordinate system and is a Cartesian coordinate system, i.e., a XYZ coordinate system. In embodiments disclosed herein, the XYZ coordinate system is a left-handed coordinate system. Namely, when fingers of a left hand are curled from the x-axis to the y-axis, a direction in which a thumb of the left hand points is the z-axis.

The mobile terminal 100 may include a body BD. The body BD may include a first body BD1 and a second body BD2. A display 151 may be positioned on a front surface of the first body BD1. A bezel BZ may be formed to surround the display 151.

The first body BD1 and the second body BD2 may be coupled to each other or separated from each other. FIG. 1 illustrates that the first body BD1 and the second body BD2 are coupled or connected to each other. The first body BD1 may be positioned farther than the second body BD2 on the y-axis. In embodiments disclosed herein, the fact that something is far positioned on the y-axis may indicate that something is positioned at an upper part (or an upper side). Further, the fact that something is close positioned on the y-axis may indicate that something is positioned at a lower part (or a lower side).

The coupling and the separation between the first body BD1 and the second body BD2 may be related to a change of a battery of the mobile terminal 100. A cover of the mobile terminal 100 may be formed as one body along with the body BD. In particular, when a back cover is formed of metal, the cover of the mobile terminal 100 may not be separated from the body BD. In this instance, in a related art, it was difficult to change the battery of the mobile terminal 100. However, in the mobile terminal 100 according to the embodiment of the invention, the battery may be connected to the second body BD2. Therefore, the battery of the mobile terminal 100 according to the embodiment of the invention can be changed.

An eject key EK may be positioned at one side of the first body BD1. The eject key EK may be related to the coupling and the separation between the first body BD1 and the second body BD2. In other words, a user may separate the first body BD1 from the second body BD2 by operating the eject key EK.

Figure 2:
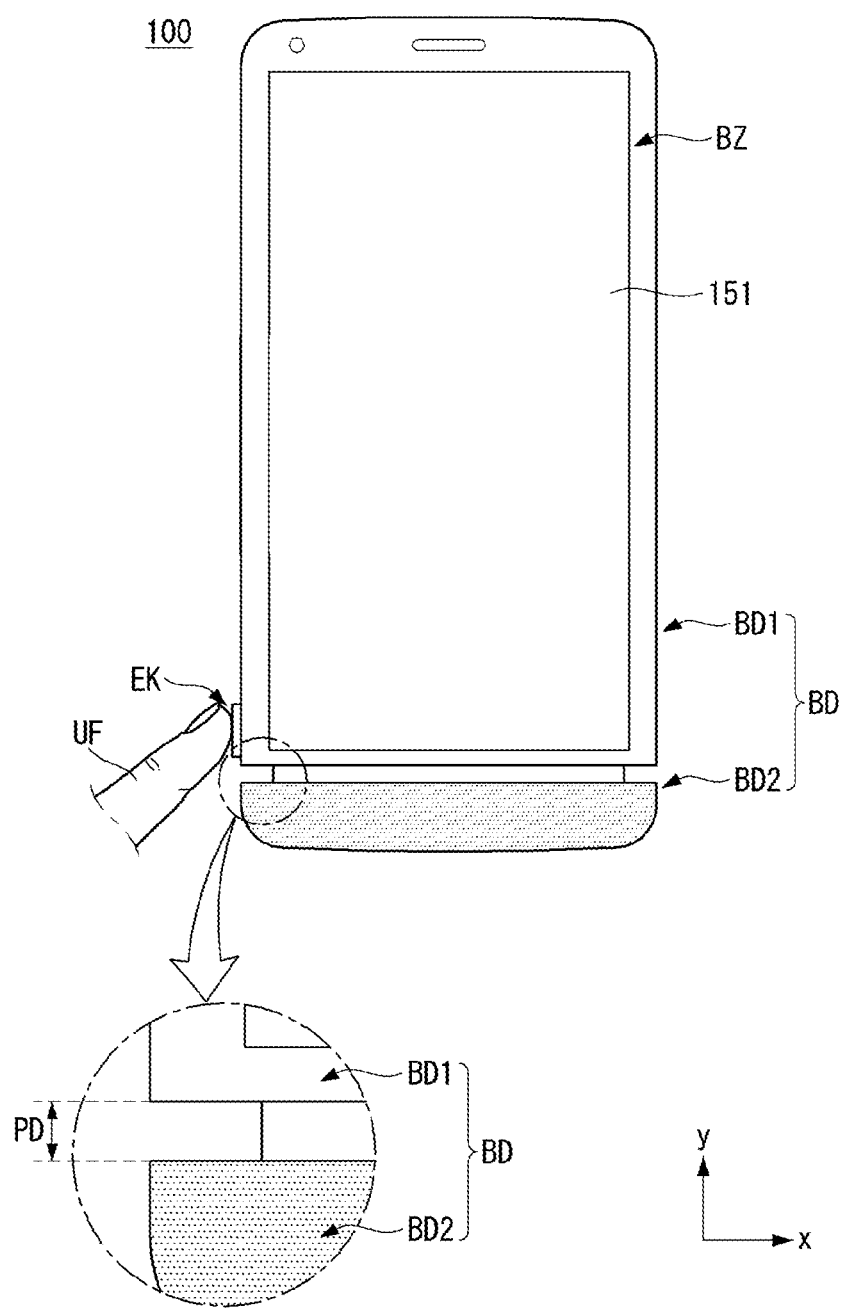
FIGS. 2 to 4 illustrate an operation of a mobile terminal shown in FIG. 1.
Figure 3:
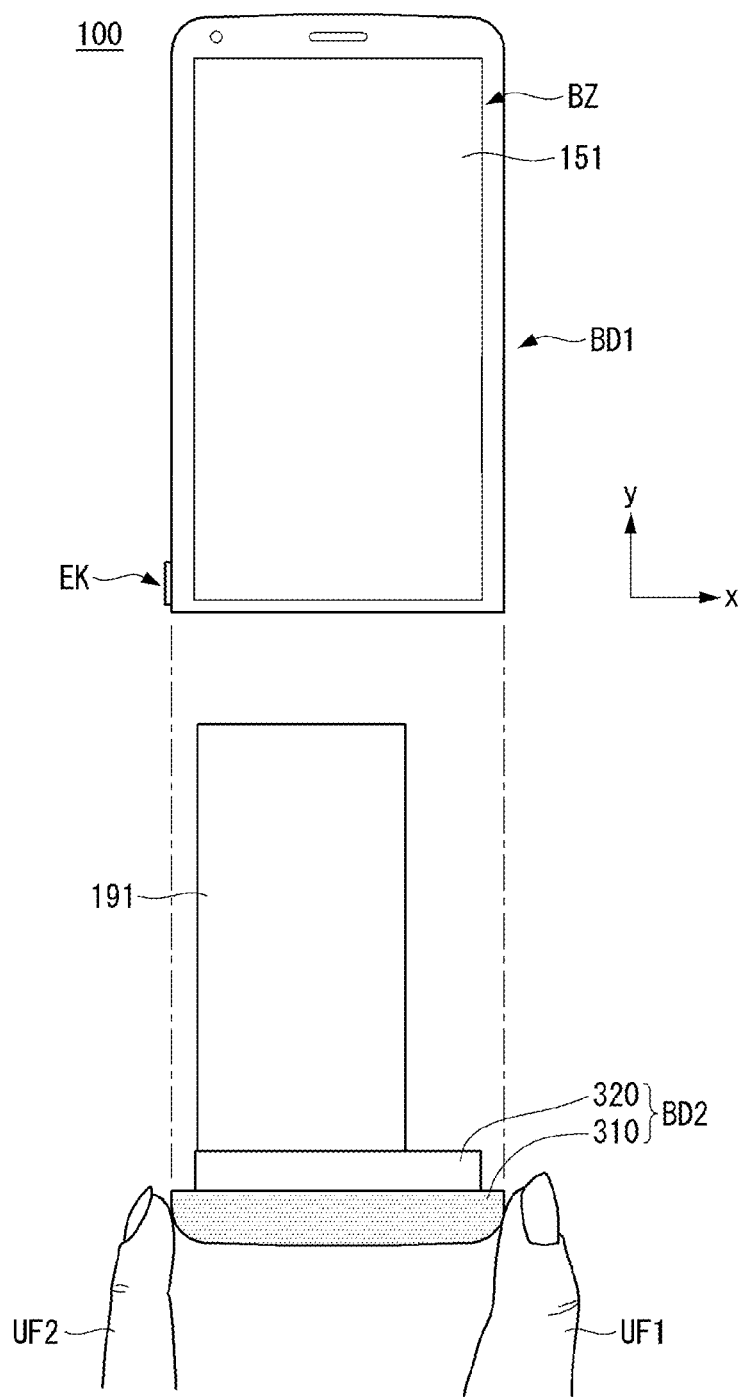
Figure 4:
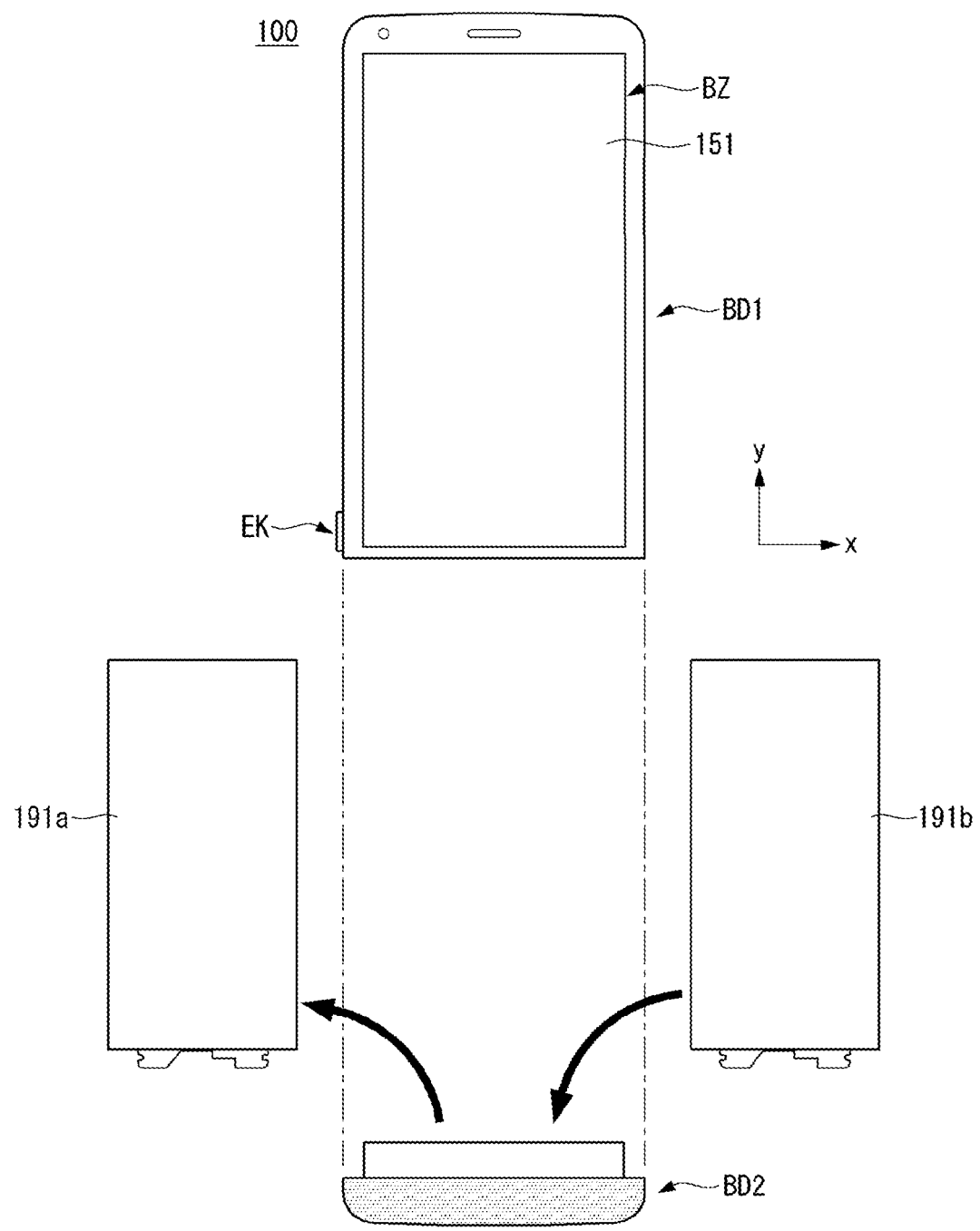

FIGS. 2 to 4 illustrate an operation of a mobile terminal shown in FIG. 1.

FIG. 2 illustrates the mobile terminal 100 according to the embodiment of the invention when the user presses the eject key EK using his or her finger UF, etc.

When the eject key EK is pressed, the second body BD2 may be spaced apart from the first body BD1 by a distance PD. A direction, in which the second body BD2 is separated from the first body BD1, may be a negative direction of the y-axis. In other words, as the eject key EK is pressed, the second body BD2 may be separated from the first body BD1 and may move toward the lower part. In this instance, the mobile terminal 100 may be in one of a plurality of states. For example, the plurality of states may include a first state in which the first and second bodies BD1 and BD2 are coupled to each other, a second state in which the first and second bodies BD1 and BD2 are spaced apart from each other by the distance PD while overlapping each other, and a third state in which the first and second bodies BD1 and BD2 are fully separated from each other.

A direction, in which the eject key EK is pressed, may be a direction of the x-axis. The pressing direction of the eject key EK may be substantially vertical to a moving direction of the second body BD2. One eject key EK or a plurality of eject keys EK may be provided.

FIG. 3 illustrates that the second body BD2 is separated from the first body BD1 in accordance with the embodiment of the invention. More specifically, FIG. 3 illustrates the mobile terminal 100 of the third state in which the second body BD2 is fully separated from the first body BD1. The user may hold the second body BD2 with his/her first and second fingers UF1 and UF2 and may move the second body BD2 in a direction away from the first body BD1 with the first and second fingers UF1 and UF2.

The mobile terminal 100 according to the embodiment of the invention may include a battery 191. The battery 191 may supply electric power to the mobile terminal 100. The battery 191 may be connected to the second body BD2. When the second body BD2 is separated from the first body BD1, the battery 191 may be separated from the first body BD1 while being connected to the second body BD2. In other words, a member may be coupled to the second body BD2. The member capable of being coupled to the second body BD2 may be the battery 191.

The second body BD2 may include a second body outer part 310 and a second body inner part 320. The second body outer part 310 may form an external appearance of the second body BD2. The second body outer part 310 may be positioned in the negative direction of the y-axis compared to the second body inner part 320. Namely, the second body outer part 310 may be positioned further from the first body BD1 than the second body inner part 320.

The first body BD1 may be positioned relatively closer to the second body inner part 320 than the second body outer part 310. The second body inner part 320 may be connected to the battery 191. The second body inner part 320 may be attached to the battery 191 and separated from the battery 191.

FIG. 4 illustrates that a battery is changed in accordance with the embodiment of the invention. The mobile terminal 100 according to the embodiment of the invention can change a battery. In a related art mobile terminal, a battery was changed by opening a back cover.

A back cover may be formed as one body along with a main body. In other words, the back cover may be formed as one body along with the first body BD1 and thus cannot be separated from the first body BD1. In this instance, in the mobile terminal 100 according to the embodiment of the invention, because the second body BD2 may be separated from the first body BD1, the battery may be changed. Thus, the embodiment of the invention can provide both a design advantage obtained from the integrated back cover and the use convenience obtained from the battery change.

A first battery 191a, that has been connected to the second body BD2, may be separated from the second body BD2. The first battery 191a, that has been connected to the second body BD2, may be a battery that needs to be charged.

The second body BD2 may be connected to a new second battery 191b. The new second battery 191b connected to the second body BD2 may be a fully charged battery. The user may change the first battery 191a for the second battery 191b and thus may rapidly supply electric power to the mobile terminal 100.

Figure 5:
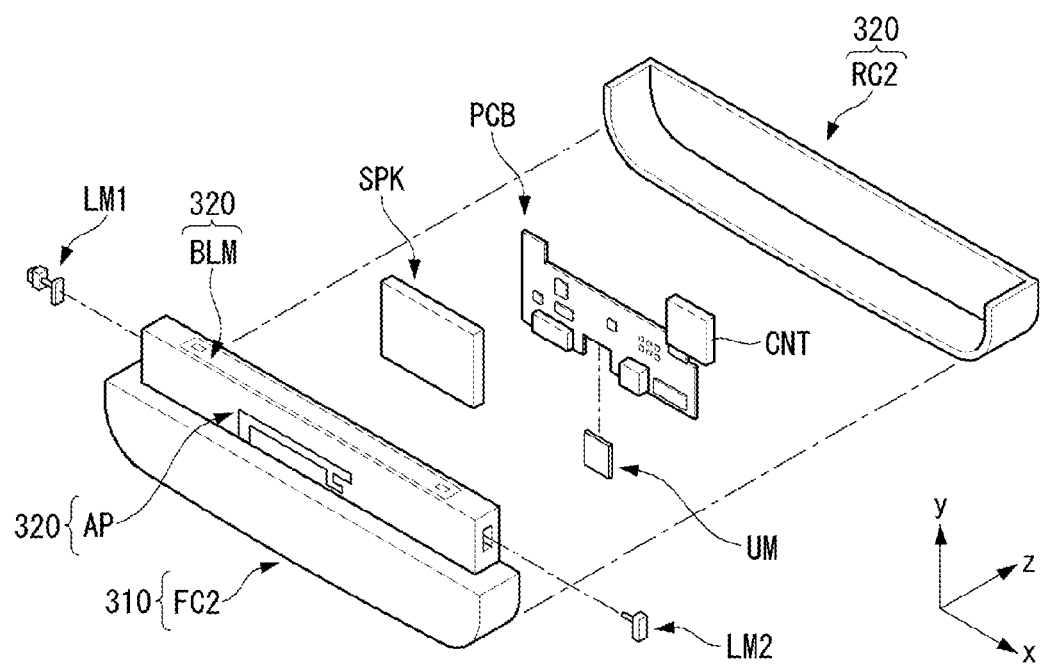
FIG. 5 is an exploded perspective view of a second body shown in FIG. 1.

FIG. 5 is an exploded perspective view of the second body shown in FIG. 1.

As shown in FIG. 5, the second body BD2 according to the embodiment of the invention may include a second body outer part 310, a second body inner part 320, a first locking module LM1, a second locking module LM2, a speaker SPK, a second board PCB, and a USB module UM.

The second body outer part 310 may include a second front cover FC2 and a second back cover RC2. The second front cover FC2 may form a front surface of the second body outer part 310, and the second back cover RC2 may form a back surface of the second body outer part 310.

The second body inner part 320 may include a battery locking module BLM and an antenna pattern AP. The battery locking module BLM may be connected to the battery.

The antenna pattern AP may be formed on an outer surface of the second body inner part 320. The antenna pattern AP may be formed inside the second body inner part 320. The antenna pattern AP may be formed toward a back surface (i.e., a positive direction of the z-axis). The antenna pattern AP may be formed toward a front surface (i.e., a negative direction of the z-axis).

The first locking module LM1 may be positioned at one side of the second body inner part 320. The first locking module LM1 may be connected to the eject key EK (see FIG. 2). In other words, when the eject key EK is pressed, the first locking module LM1 may operate. The first locking module LM1 may be related to the coupling and the separation of the second body BD2 to and from the first body BD1.

The second locking module LM2 may be positioned at one side of the second body inner part 320. The second locking module LM2 may be connected to a second locking module housing. The second locking module housing may be positioned at one side of the first body BD1 (see FIG. 2).

The battery locking module BLM may be positioned on an upper surface of the second body inner part 320. The battery locking module BLM may be positioned in a coupling groove of the upper surface of the second body inner part 320. The coupling groove of the upper surface may be a portion depressed to the inside of the second body inner part 320. Namely, the battery locking module BLM may be positioned inside the coupling groove so that the battery locking module BLM is not exposed to the outside.

The speaker SPK may be positioned between the second front cover FC2 and the second back cover RC2. The speaker SPK may provide sound information or voice information for the user. The speaker SPK may be connected to the second board PCB.

The second board PCB may be positioned between the second front cover FC2 and the second back cover RC2. The second board PCB may be connected to the speaker SPK, the USB module UM, the antenna pattern AP, etc. The second board PCB may transmit and receive an electrical signal to and from the speaker SPK, the USB module UM, the antenna pattern AP, etc. The second board PCB may exchange a single for a main board MPCB embedded in the first body BD1. Namely, a path capable of transferring an electrical signal may be formed between the second board PCB and the main board MPCB. A connector CNT may be formed in a contact portion of the first and second bodies BD1 and BD2, so as to form the path for transferring the electrical signal. The connector CNT may connect the second circuit board PCB to the main circuit board MPCB in the first state.

The USB module UM may be positioned between the second front cover FC2 and the second back cover RC2. The USB module UM may be connected to the outside through a USB. Namely, the USB module UM may be configured such that the mobile terminal 100 according to the embodiment of the invention USB-communicates with an external device.

Figure 6:
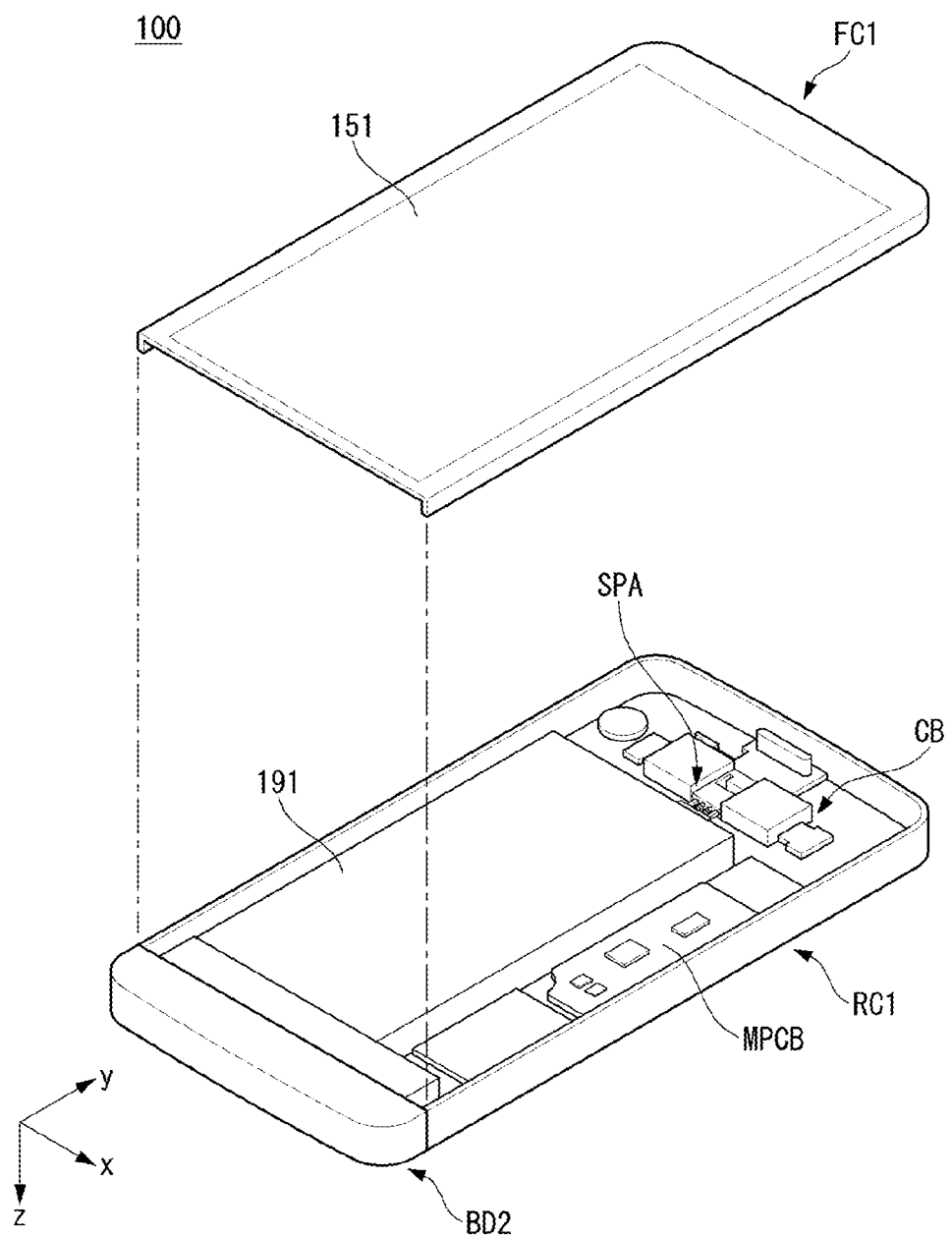
FIG. 6 is an exploded perspective view of a mobile terminal shown in FIG. 1.

FIG. 6 is an exploded perspective view of the mobile terminal shown in FIG. 1.

The first body BD1 may include a first front cover FC1, a first back cover RC1, the main board MPCB, a spring assembly SPA, and a camera bracket CB.

The main board MPCB, the spring assembly SPA, and the camera bracket CB may be positioned between the first front cover FC1 and the first back cover RC1. The first front cover FC1 may face toward the front surface of the mobile terminal 100. Namely, the first front cover FC1 may face toward the negative direction of the z-axis. The display 151 may be formed on the first front cover FC1. The first back cover RC1 may face toward the back surface of the mobile terminal 100. Namely, the first back cover RC1 may face toward the positive direction of the z-axis.

The first front cover FC1 and the first back cover RC1 may be formed as one body. Namely, the first front cover FC1 and the first back cover RC1 may not be separated from each other. In FIG. 6, the first front cover FC1 and the first back cover RC1 are exploded and shown for convenience of explanation and understanding.

The main board MPCB may be positioned next to the battery 191. The main board MPCB may be concerned in an entire operation of the mobile terminal 100. The main board MPCB may be connected to the battery 191, the display 151, and a camera, etc.

The battery 191 may be positioned on a battery receiving portion inside the first body BD1. The battery receiving portion may be an empty space until the battery 191 is positioned. Namely, the battery receiving portion may be a space communicating with an opening, to which the first body BD1 is coupled.

The battery 191 may be inserted into the first body BD1 so that a battery terminal is positioned inside the first body BD1. Namely, the battery terminal, that is a path for supplying electric power to the mobile terminal 100 from the battery 191, may be positioned adjacent to the spring assembly SPA.

The camera bracket CB may be positioned at the upper side of the mobile terminal 100. Namely, an upper end of the first body BD1 may be positioned closer to the camera bracket CB than the battery 191. The camera bracket CB may provide a space, in which the camera is installed. The camera bracket CB according to the embodiment of the invention may provide a space, in which two cameras are installed.

The spring assembly SPA may be connected to the camera bracket CB. The spring assembly SPA may provide a force between the camera bracket CB and the battery 191. The force provided by the spring assembly SPA may be a restoring force or an elastic force. The spring assembly SPA may provide a force, that causes the second body BD2 to be separated from the first body BD1. A direction of the force, that the spring assembly SPA provides for the second body BD2, may be a downward direction (i.e., the negative direction of the y-axis) based on the first body BD1.

Figure 7:
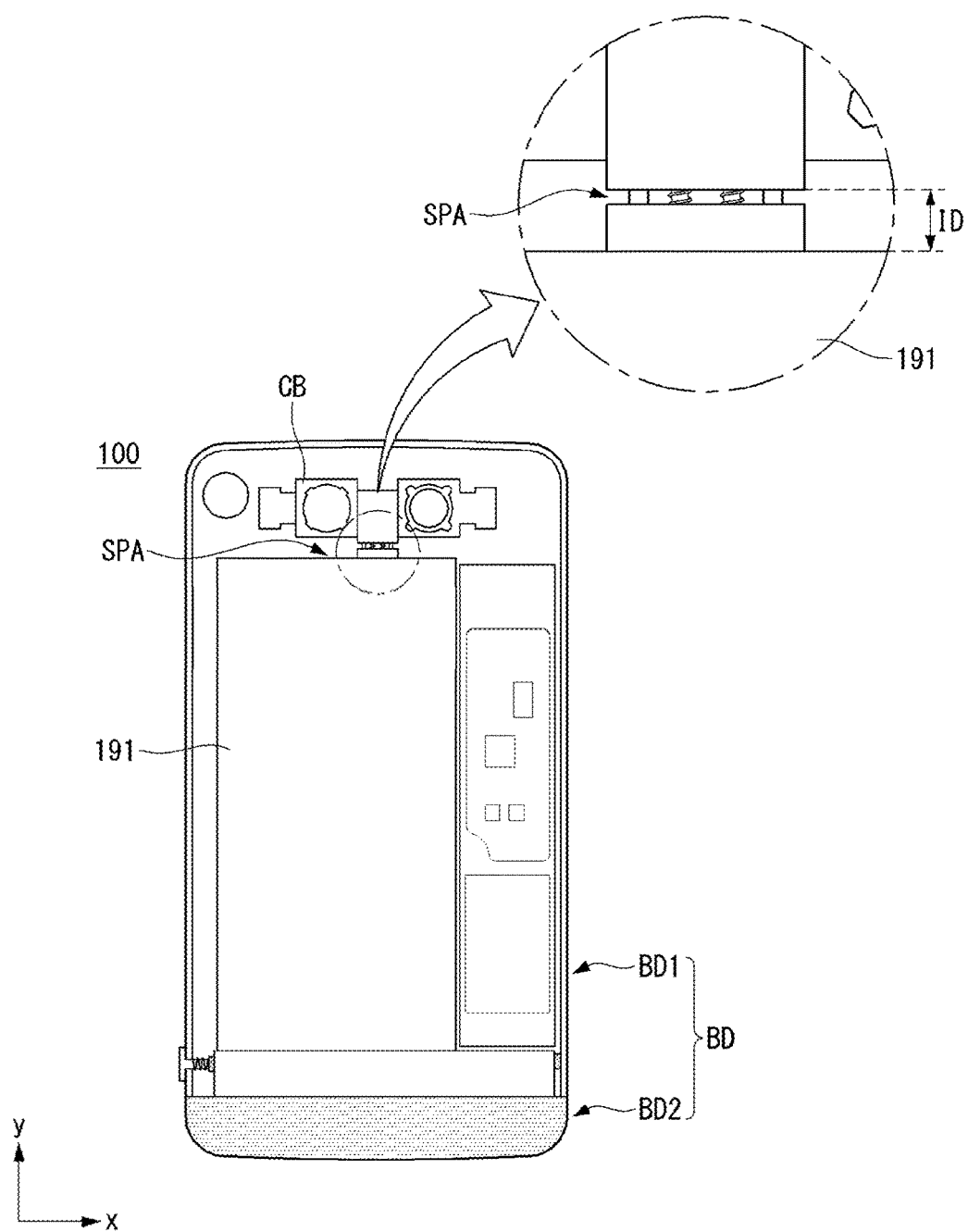
FIGS. 7 and 8 illustrate a spring assembly shown in FIG. 6.
Figure 8:
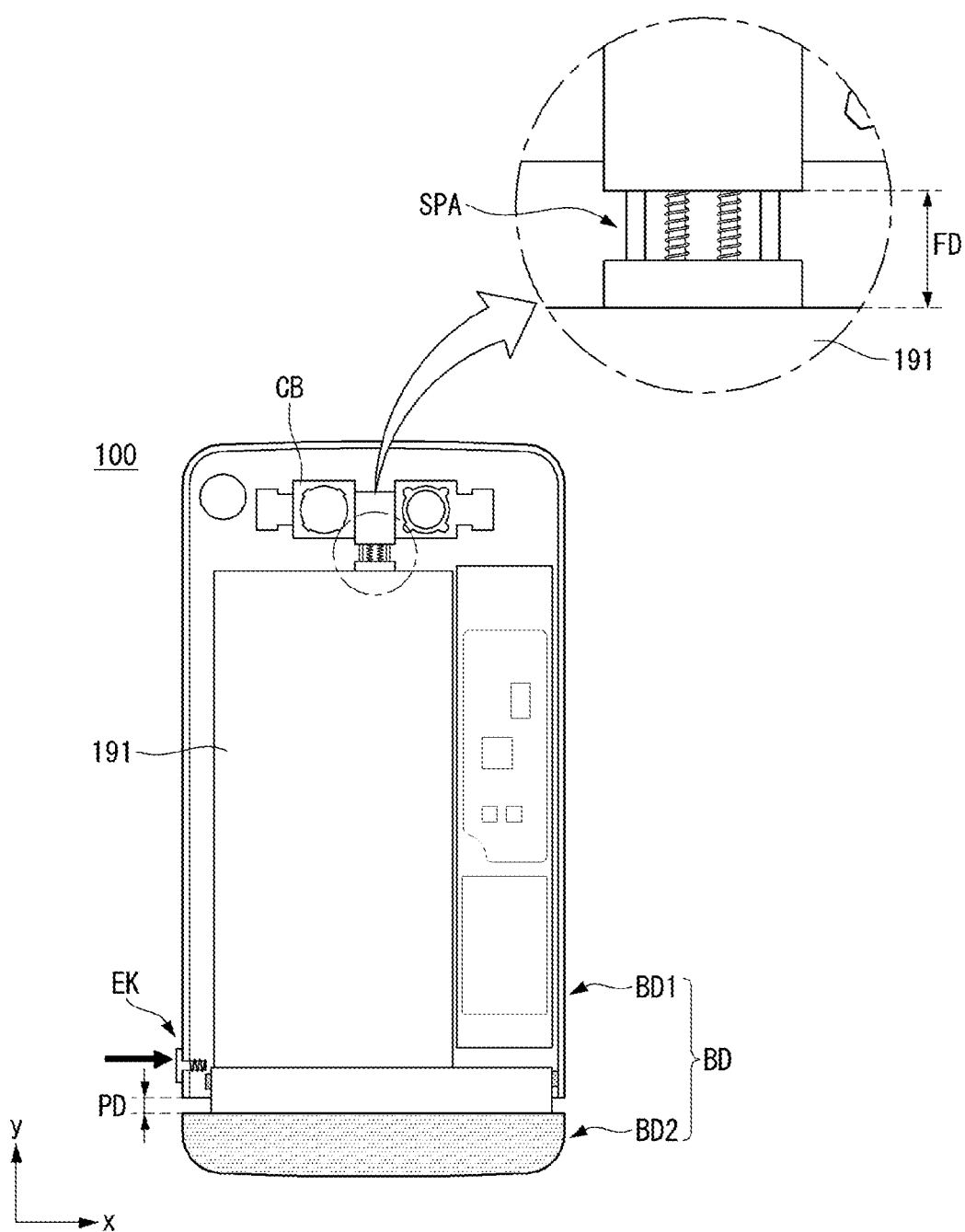

FIGS. 7 and 8 illustrate the spring assembly shown in FIG. 6.

As shown in FIG. 7, when the second body BD2 is coupled to the first body BD1, the camera bracket CB and the battery 191 may be spaced apart from each other by a distance ID. The spring assembly SPA may provide an elastic force (or a restoring force) for the camera bracket CB and the battery 191. The elastic force provided by the spring assembly SPA may be a repulsive force. Namely, the force provided by the spring assembly SPA may be applied so that the first body BD1 and the second body BD2 may be far away from each other. When the second body BD2 is coupled to the first body BD1, there may be substantially no distance between the first body BD1 and the second body BD2.

When the second body BD2 is coupled to the first body BD1, the battery 191 may be connected to the first body BD1 and may supply the electric power to the first body BD1. The battery 191 may be connected to the first body BD1 in a press-fit pin manner. Elasticity may be provided for a press-fit pin. Namely, even if the battery 191 is physically spaced apart from the first body BD1 by a predetermined distance, the battery 191 may be electrically connected to the first body BD1. In other words, in the first state in which the first and second bodies BD1 and BD2 are coupled to each other, and the second state in which the first and second bodies BD1 and BD2 are spaced apart from each other by a predetermined distance, a connection state between the battery 191 and the first body BD1 may be maintained. Thus, even when the mobile terminal 100 is in the second state by carelessness of the user, the mobile terminal 100 may be prevented from being turned off.

FIG. 8 illustrates that the first and second bodies BD1 and BD2 are semi-coupled to each other. For example, a semi-coupling state may indicate a state after the eject key EK is pressed. In other words, the semi-coupling state may be a state of the spring assembly SPA when the mobile terminal 100 is in the second state.

When the eject key EK is pressed, the second body BD2 may move by an elastic force of the spring assembly SPA applied to the second body BD2. When the eject key EK is pressed, the second body BD2 hanging to the first body BD1 may move. A force, that makes the second body BD2 move, may be provided by the spring assembly SPA.

Even if the second body BD2 moves from the first body BD1 after the eject key EK is pressed, the second body BD2 may not be fully separated from the first body BD1. Namely, the mobile terminal 100 may be in the second state because of an operation of the second locking module LM2 (see FIG. 5). A mechanism of the second locking module LM2 will be described in detail in corresponding parts.

After the eject key EK is pressed, the second body BD2 may move from the first body BD1 by a distance PD. In embodiments disclosed herein, the distance PD may be a substantially previously determined distance. For example, the distance PD may be a moving distance of the second body BD2 due to the elastic force of the spring assembly SPA and/or the second locking module LM2.

The second body BD2 may move from the first body BD1, and at the same time the battery 191 may move from the camera bracket CB. When the second body BD2 moves from the first body BD1 by the distance PD, the battery 191 may move from the camera bracket CB by a distance FD. Namely, as the battery 191 moves from the camera bracket CB by the distance FD, the second body BD2 may move from the first body BD1 by the distance PD.

Figure 9:
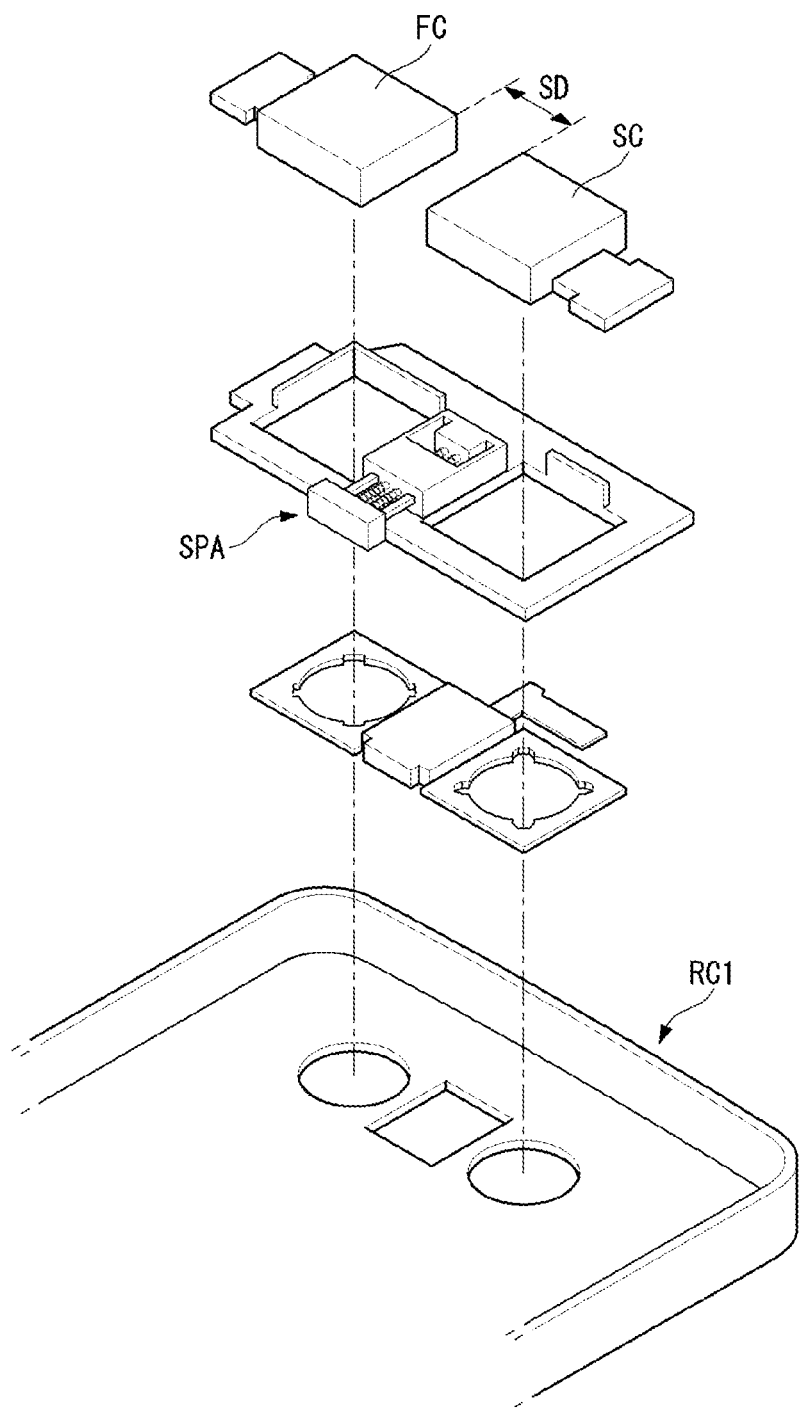
FIG. 9 is an exploded perspective view of a spring assembly and a camera bracket shown in FIG. 6.

FIG. 9 is an exploded perspective view of the spring assembly and the camera bracket shown in FIG. 6.

As shown in FIG. 9, the spring assembly SPA and the camera bracket CB may be positioned on an upper part of the mobile terminal 100.

A first camera FC and a second camera SC may be positioned in the camera bracket CB. The first camera FC and the second camera SC may be disposed in parallel with each other on the x-axis. A predetermined distance may be maintained between the first camera FC and the second camera SC. As shown in FIG. 9, the first camera FC and the second camera SC may be spaced apart from each other by a distance SD. The distance SD may be necessary to secure viewing angles of the first camera FC and the second camera SC.

The distance SD may be a space that is not used between the first camera FC and the second camera SC. In another embodiment, the spring assembly SPA may be positioned in the space SD. Namely, the spring assembly SPA may be positioned between the first camera FC and the second camera SC. An additional space for the spring assembly SPA can be minimized by utilizing the space between the first camera FC and the second camera SC. Namely, an inner space of the mobile terminal 100 can be more efficiently used.

Figure 10:
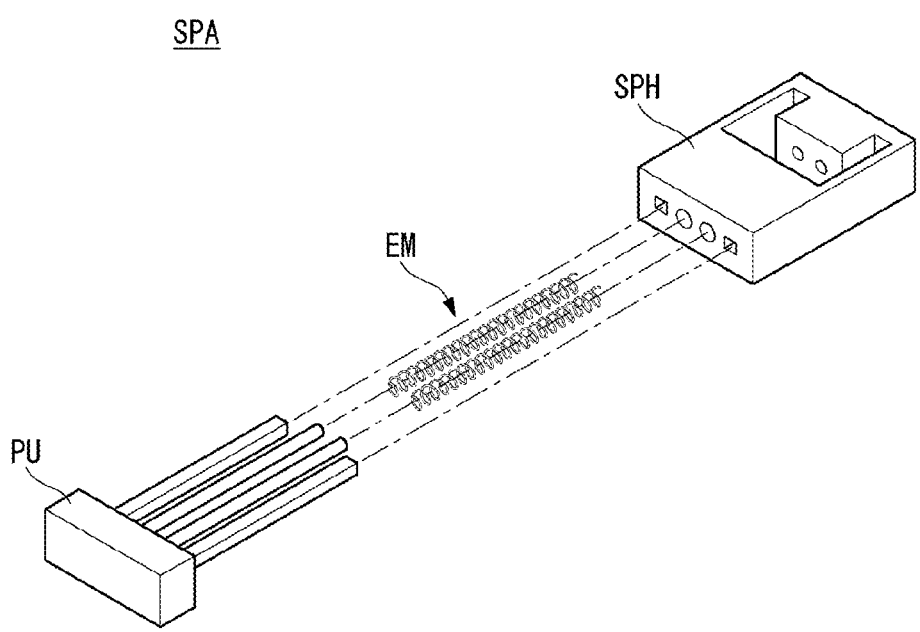
FIG. 10 is an exploded perspective view of a spring assembly shown in FIG. 9.

FIG. 10 is an exploded perspective view of the spring assembly shown in FIG. 9.

As shown in FIG. 10, the spring assembly SPA may include a spring housing SPH, an elastic module EM, and a pusher PU.

The spring housing SPH may provide a formation space of the elastic module EM and the pusher PU. The spring housing SPH may be positioned between the first camera FC (see FIG. 9) and the second camera SC (see FIG. 9).

At least a portion of the elastic module EM may be positioned inside the spring housing SPH. The elastic module EM may be connected to the pusher PU and may provide an elastic force for the pusher PU. In particular, the elastic module EM may be a spring. The elastic module EM may have the elastic force as the elastic module EM is compressed. Namely, the elastic module EM may provide the elastic force in an extension direction of the elastic module EM.

At least a portion of the pusher PU may be positioned inside the spring housing SPH. The pusher PU may be connected to the elastic module EM and may be provided with the elastic force by the elastic module EM. The pusher PU may contact the battery 191 and transfer the elastic module EM to the battery 191. Namely, the elastic force generated by the elastic module EM may be transferred to the battery 191 via the pusher PU.

Figure 11:
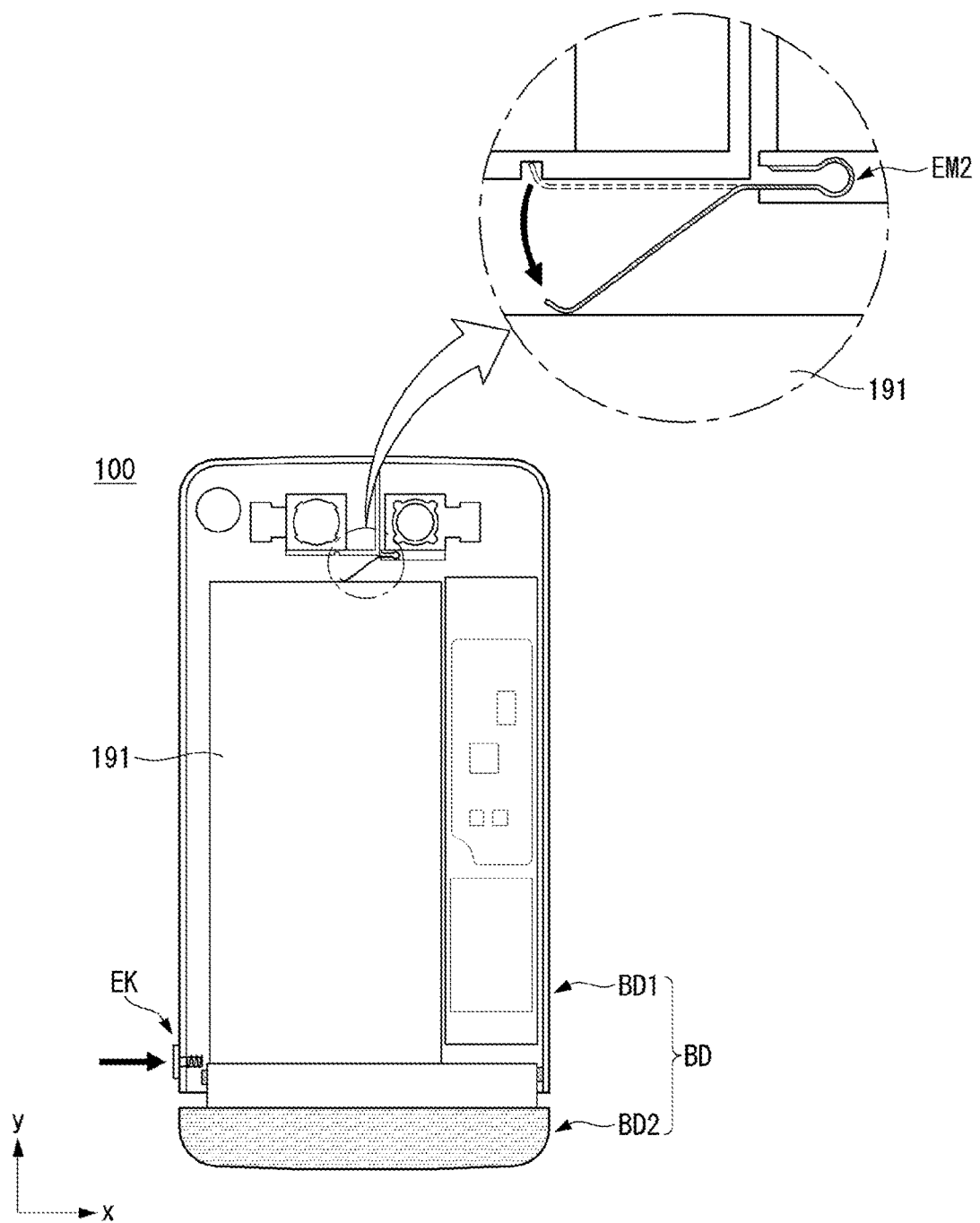
FIGS. 11 and 12 illustrate another configuration of a spring assembly according to an embodiment of the invention.
Figure 12:
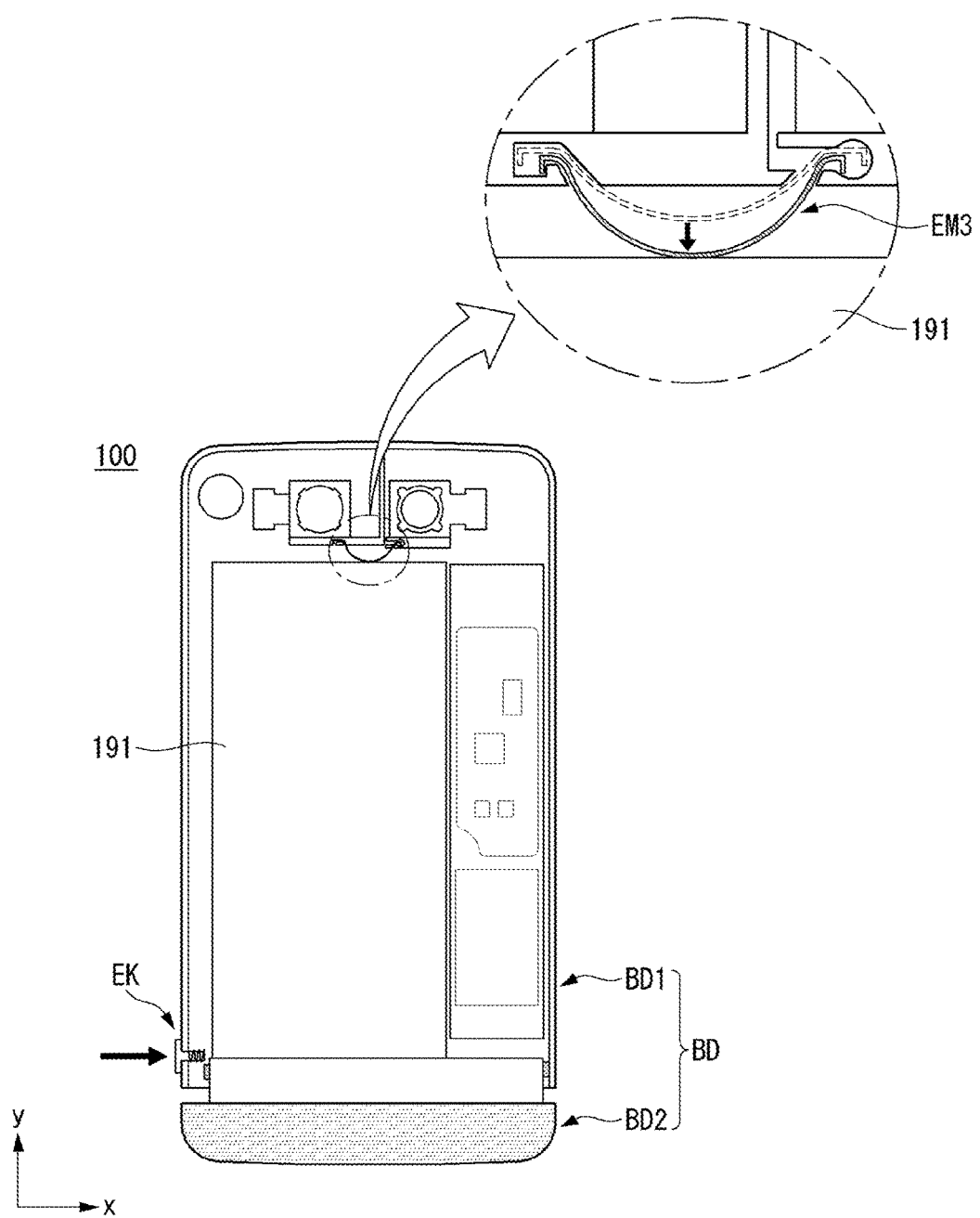

FIGS. 11 and 12 illustrate another configuration of a spring assembly according to the embodiment of the invention.

As shown in FIG. 11, a spring assembly SPA may include a second elastic module EM2 of a cantilever structure.

The second elastic module EM2 may be a kind of a plate spring and may provide an elastic force. An arrow shown in FIG. 11 indicates a direction of the elastic force. A dotted line shown in FIG. 11 indicates a compressed state of the second elastic module EM2. One side of the second elastic module EM2 may be connected to the camera bracket CB. Namely, one side of the second elastic module EM2 may be connected to one side of the first body BD1, and the other side of the second elastic module EM2 may contact the battery 191 to provide an elastic force for the battery 191.

The spring assembly SPA including the second elastic module EM2 of FIG. 11 may have a simpler structure than the spring assembly SPA including the elastic module EM of FIG. 10. Namely, the spring assembly SPA including the second elastic module EM2 of FIG. 11 may have the structure not including the spring housing SPH and the pusher PU of FIG. 10. Thus, the spring assembly SPA including the second elastic module EM2 of FIG. 11 may have better durability than the spring assembly SPA including the elastic module EM of FIG. 10.

As shown in FIG. 12, a spring assembly SPA may include a third elastic module EM3 having a semicircular shape or a circular arc shape.

When the shape of the third elastic module EM3 changes by an energy or a force applied from the outside, the third elastic module EM3 may have an elastic force. When a radius of curvature of the third elastic module EM3 changes by an external energy applied to the third elastic module EM3, the third elastic module EM3 may have the elastic force. A dotted line shown in FIG. 12 indicates a compressed state of the third elastic module EM3. An arrow shown in FIG. 12 indicates a direction of the elastic force.

The spring assembly SPA including the third elastic module EM3 of FIG. 12 may have a structure simpler than the spring assembly SPA including the elastic module EM of FIG. 10. Namely, the spring assembly SPA including the third elastic module EM3 of FIG. 12 may have the structure excluding the spring housing SPH of FIG. 10. Thus, the spring assembly SPA including the third elastic module EM3 of FIG. 12 may have better durability than the spring assembly SPA including the elastic module EM of FIG. 10. The spring housing SPH may connect both ends of the third elastic module EM3.

FIGS. 13 to 20 illustrate the eject key of the mobile terminal shown in FIG. 1 and a configuration related to the eject key.

Figure 13:
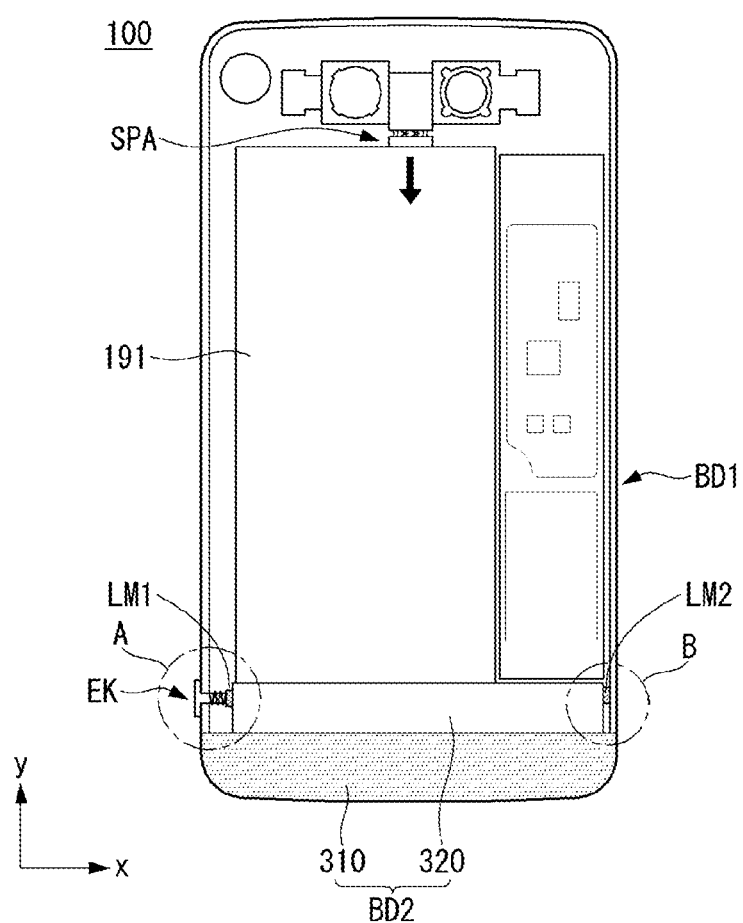
FIGS. 13 to 20 illustrate an eject key of a mobile terminal shown in FIG. 1 and a configuration related to the eject key.

As shown in FIG. 13, the second body BD2 may include a first locking module LM1 and a second locking module LM2. The first body BD1 according to the embodiment of the invention may include an eject key EK and a second locking module housing LM2H (see FIG. 17). FIG. 13 shows the mobile terminal 100, in which the first front cover FC1 is removed, for convenience of explanation and understanding.

The first locking module LM1 may be positioned adjacent to the eject key EK. The first locking module LM1 may contact the eject key EK. The first locking module LM1 may be connected to the eject key EK. The first locking module LM1 may be positioned at one side of the second body BD2.

The first locking module LM1 may move by a predetermined distance on one side of the second body BD2. A connection relationship between the first body BD1 and the second body BD2 may vary depending on a location of the first locking module LM1 on one side of the second body BD2. In other words, a movement of the second body BD2 resulting from an elastic force provided by a spring assembly SPA may be determined depending on a location of the first locking module LM1 at one side of the second body BD2. In FIG. 13, an arrow indicates a direction of the elastic force provided by the spring assembly SPA, and "A" indicates an area, in which the eject key EK and the first locking module LM1 are positioned.

The second locking module LM2 may be positioned on the other side of the second body BD2. For example, the second locking module LM2 may be positioned opposite the first locking module LM1. Namely, the second locking module LM2 may face the first locking module LM1 on the line substantially parallel to the x-axis. The second locking module LM2 may be connected to the second locking module housing LM2H. The second locking module LM2 may be inserted into the second locking module housing LM2H. A state where the second locking module LM2 is inserted into the second locking module housing LM2H may indicate a state where the second body BD2 is not separated from the first body BD1. In FIG. 13, "B" indicates an area, in which the second locking module LM2 and the second locking module housing LM2H are positioned.

The spring assembly SPA may provide an elastic force capable of separating the second body BD2 from the first body BD1. Namely, the second body BD2 may move through the elastic force provided by the spring assembly SPA, so that the second body BD2 is separated from the first body BD1.

The first locking module LM1 and the second locking module LM2 may put a limit on a movement of the second body BD2. The movement of the second body BD2 may be obstructed by operations of the first locking module LM1 and the eject key EK. Further, the movement of the second body BD2 may be obstructed by operations of the second locking module LM2 and the second locking module housing LM2H.

Figure 14:
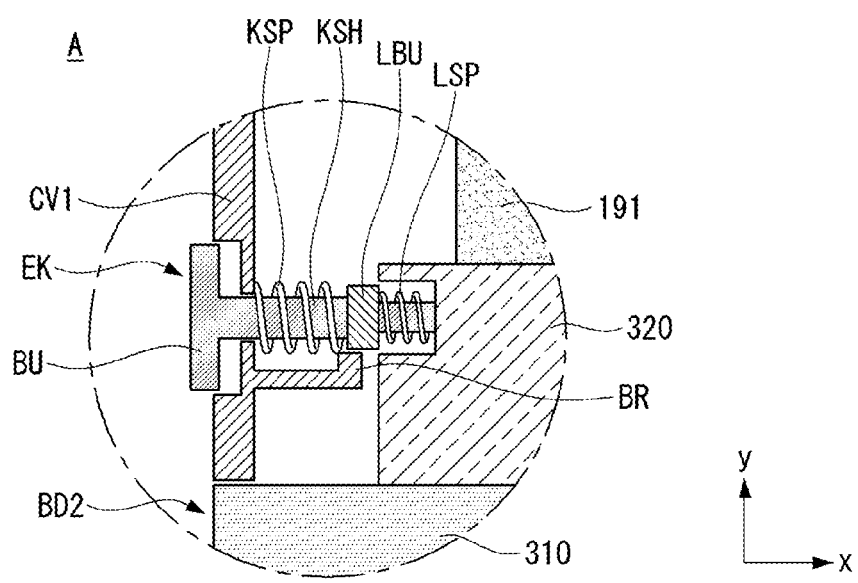
Figure 15:
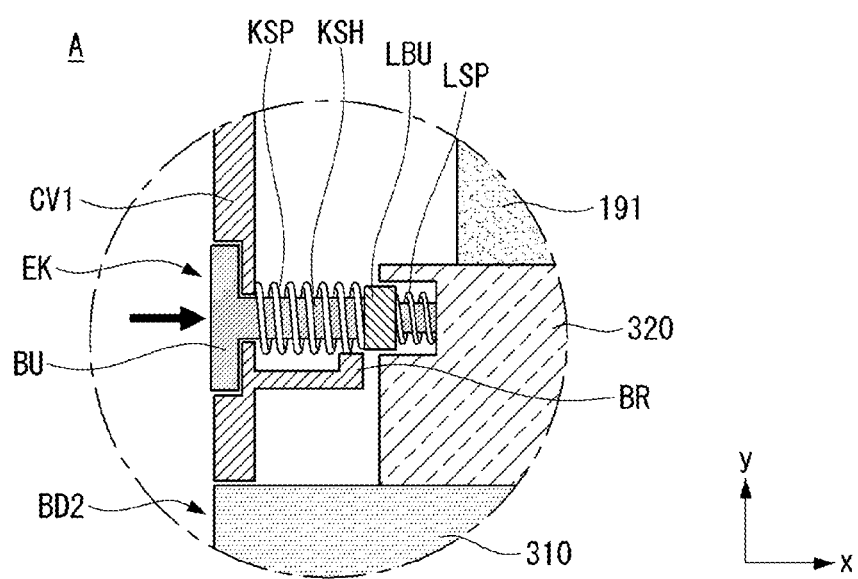
Figure 16:
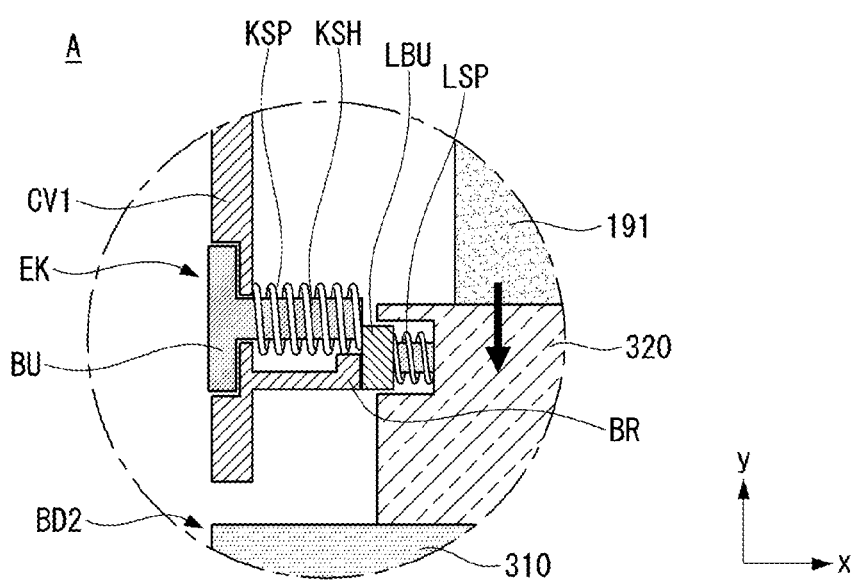

FIGS. 14 to 16 are cross-sectional views illustrating the area "A" of FIG. 13. However, a key spring KSP and a locking spring LSP are shown as a perspective view in FIGS. 14 to 16. FIGS. 14 to 16 sequentially illustrate a movement of the first locking module LM1 and a movement of the second body BD2 as the eject key EK is pressed by an external force. The first front cover FC1 (see FIG. 6) and the first back cover RC1 (see FIG. 6) may form a first cover CV1.

The eject key EK may include a button BU, a key shaft KSH, a key spring KSP, and a finger stop BR. The button BU may form a portion exposed to the outside from the eject key EK and may be connected to the key shaft KSH. The button BU may receive a force from the outside and may transfer the force to the key shaft KSH.

At least a portion of the key shaft KSH may pass through a portion of the first cover CV1. The key shaft KSH may contact a locking button LBU. The key shaft KSH may transfer the force to the locking button LBU.

One end of the key spring KSP may be connected to the first cover CV1, and the other end of the key spring KSP may be connected to the key shaft KSH. The key spring KSP may provide an elastic force for the key shaft KSH.

The finger stop BR may be connected to the first cover CV1. The finger stop BR may be positioned inside the first cover CV1 and may be extended toward the inside of the first cover CV1. The finger stop BR may contact the locking button LBU.

The first locking module LM1 may include a locking button LBU, a locking shaft LSH, and a locking spring LSP. The locking button LBU may adjoin the key shaft KSH. The locking button LBU may be connected to the locking shaft LSH.

The locking shaft LSH may be connected to the locking button LBU. The locking shaft LSH may receive a force from the locking button LBU or may transfer the force to the locking button LBU. Namely, the locking button LBU may transfer the force received from the key shaft KSH to the locking shaft LSH, and the locking shaft LSH may transfer the force received from the locking spring LSP to the locking button LBU.

One end of the locking spring LSP may be connected to the locking shaft LSH, and the other end of the locking spring LSP may be connected to one side of the second body inner part 320. The locking spring LSP may provide an elastic force for the locking shaft LSH.

When the finger stop BR contacts the locking button LBU, the finger stop BR may be positioned on a path of the locking button LBU moving by an elastic force provided by the spring assembly SPA. Thus, as shown in FIG. 14, when the finger stop BR contacts the locking button LBU, it may be difficult to downwardly (or in the negative direction of the y-axis) move the second body BD2.

FIG. 15 illustrates a situation when a force is applied to the button BU using a user's finger UF. In FIG. 15, an arrow indicates a direction of a force of a spring. Namely, the key spring KSP may provide the elastic force for the key shaft KSH in a direction pushing the button BU to the outside. Further, the locking spring LSP may provide the elastic force for the locking shaft LSH in a direction hooking the locking button LBU to the finger stop BR.

The locking button LBU may be substantially separated from the finger stop BR by an operation of the user's finger UF. Namely, the finger stop BR may not be positioned on a moving path of the locking button LBU.

FIG. 16 illustrates that the second body BD2 moves as the first locking module LM1 is released. In FIG. 16, an arrow indicates a direction of the elastic force applied by the spring assembly SPA.

Figure 17:
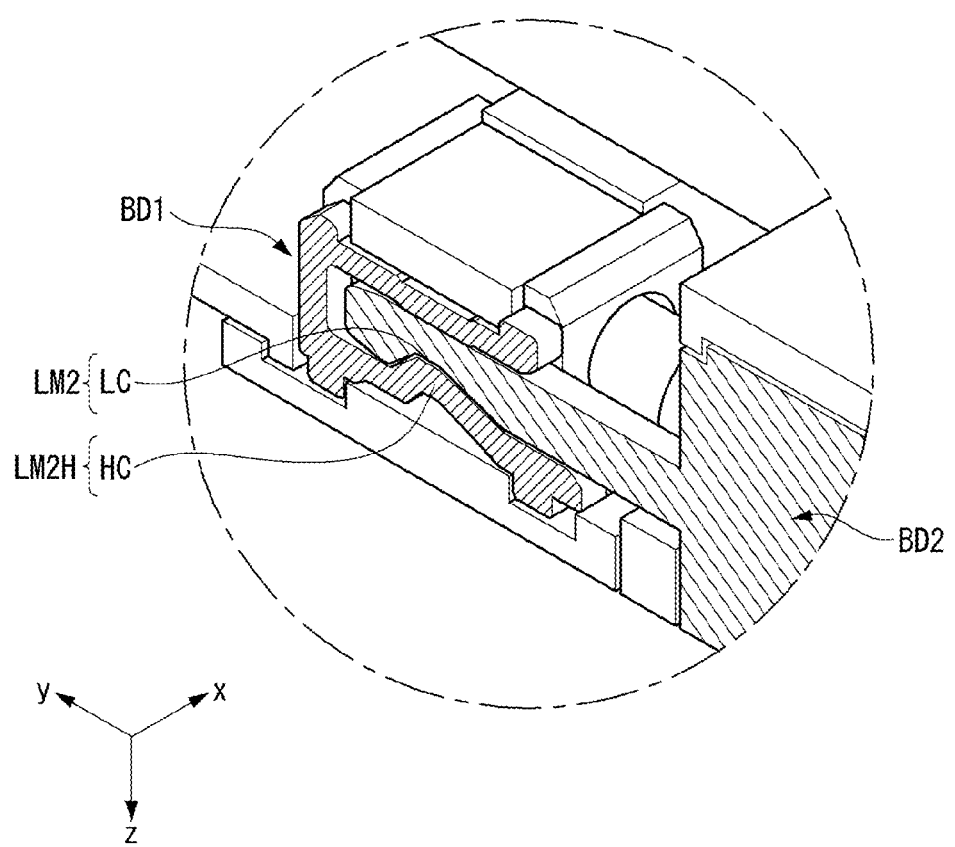

FIG. 17 is a perspective view illustrating the area "B" of FIG. 13. The second locking module LM2 may have a locking curved portion LC. The second locking module housing LM2H may have a housing curved portion HC.

The locking curved portion LC may be positioned opposite the housing curved portion HC. A shape of the locking curved portion LC may correspond to a shape of the housing curved portion HC. For example, if the locking curved portion LC has a convex shape protruding toward the housing curved portion HC, the housing curved portion HC may have a concave shape depressed toward the locking curved portion LC.

The locking curved portion LC may have a convex shape protruding toward the housing curved portion HC. Alternatively, the locking curved portion LC may have a concave shape depressed toward the housing curved portion HC. When the locking curved portion LC has the concave shape depressed toward the housing curved portion HC, a space may be saved.

The locking curved portion LC may be inserted into the housing curved portion HC. Namely, the second locking module LM2 may be inserted into the second locking module housing LM2H. As the locking curved portion LC is inserted into the housing curved portion HC, the second body BD2 may not be separated from the first body BD1.

Figure 18:
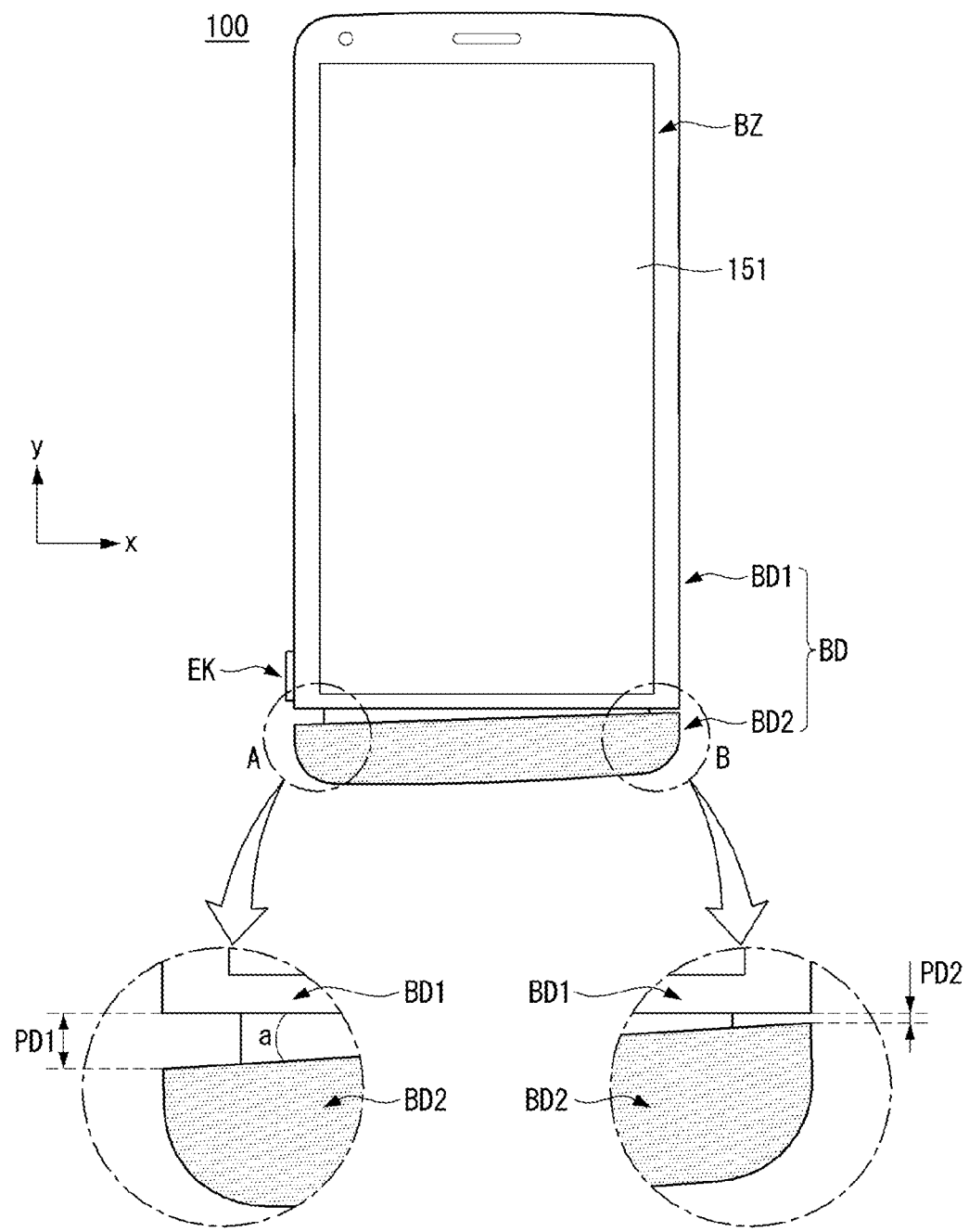

FIG. 18 illustrates a state of the mobile terminal 100 in which the eject key is pressed. In a contact area of the first body BD1 and the second body BD2, "A" is a formation area of the eject key EK, and "B" is a formation area of the second locking module LM2 (see FIG. 13).

When the eject key EK is pressed by the user, etc., a force for separating the second body BD2 from the first body BD1 may be transferred to the area A. When the eject key EK is pressed, the first locking module LM1 may not hang to the eject key EK and thus may not be a barrier to a movement of the second body BD2. Namely, the formation area A of the first locking module LM1 may receive the elastic force provided by the spring assembly SPA and may move.

Even when the eject key EK is pressed by the user, etc., the second locking module LM2 may remain in a state of being inserted into the second locking module housing LM2H. Namely, the second locking module LM2 may be a barrier to the movement of the second body BD2. Because the second body BD2 may move by a distance PD1 in the area A, the second body BD2 may move by a distance PD2 in the area B even if the second locking module LM2 is the barrier to the movement of the second body BD2. Namely, the mobile terminal 100 may be in the second state where the first and second bodies BD1 and BD2 are spaced apart from each other by a predetermined distance but are not fully separated from each other.

The distance PD1 may be greater than the distance PD2. A predetermined angle 'a' may be formed between the first body BD1 and the second body BD2 by a difference between the distances PD1 and PD2. Namely, the second body BD2 may be inclined to the first body BD1.

Figure 19:
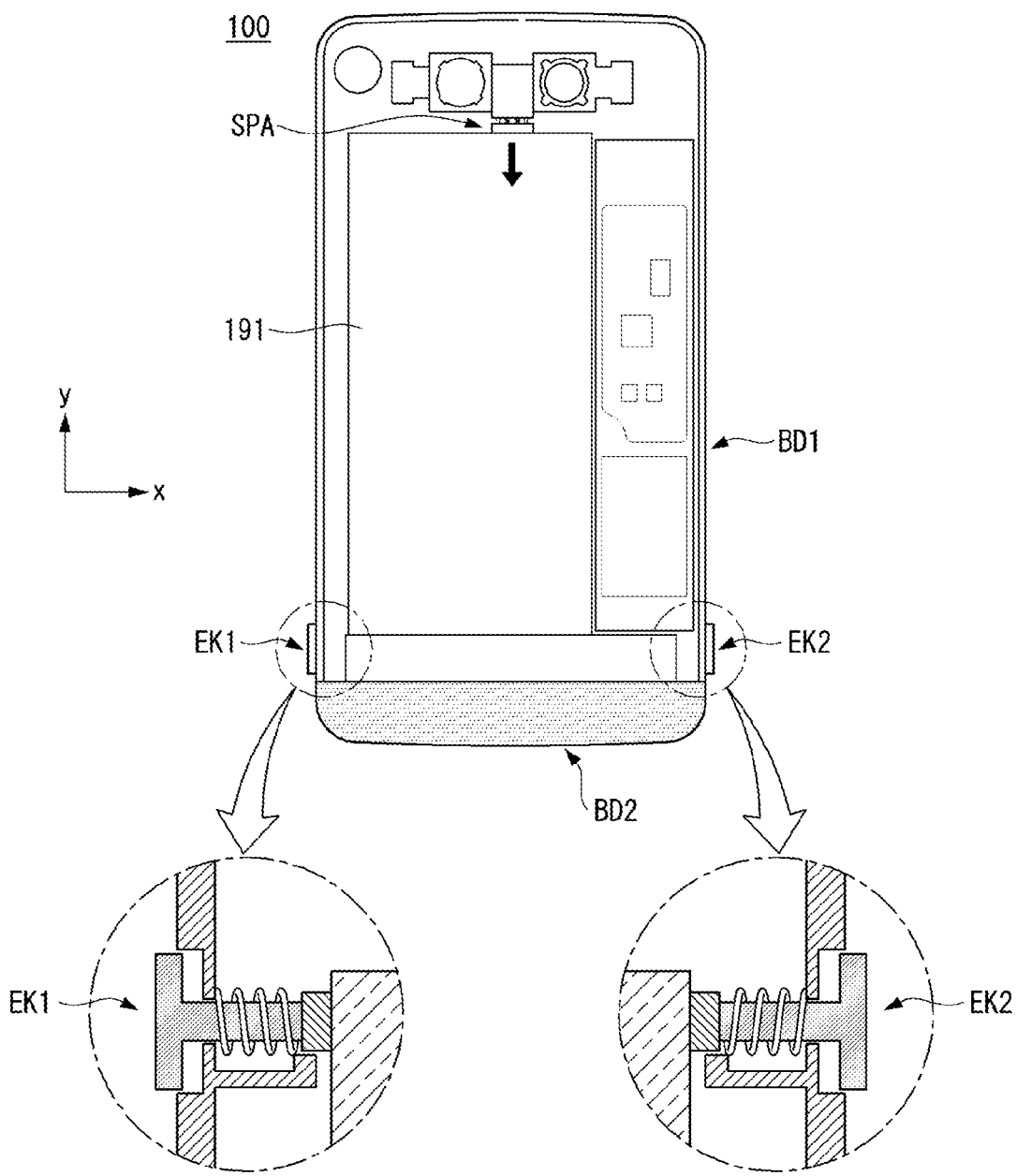

FIG. 19 illustrates a mobile terminal including a plurality of first locking modules in accordance with an embodiment of the invention. For example, two first locking modules LM1 may be respectively positioned on left and right sides of the mobile terminal. Namely, the two first locking modules LM1 may be respectively positioned on left and right sides on the x-axis.

A plurality of eject keys EK may be provided corresponding to a plurality of first locking modules LM1. When the user presses all of the plurality of eject keys EK and releases the plurality of first locking modules LM1 from the plurality of eject keys EK, the second body BD2 may be separated from the first body BD1.

Because the first locking module LM1 has more complex configuration than the second locking module LM2, configuration of the mobile terminal 100 including the plurality of first locking modules LM1 instead of the second locking module LM2 may be more complex. However, because the user has to press all of the plurality of eject keys EK so as to separate the second body BD2 from the first body BD1, the number of cases in which the second body BD2 is separated from the first body BD1 by carelessness of the user may decrease.

Figure 20:
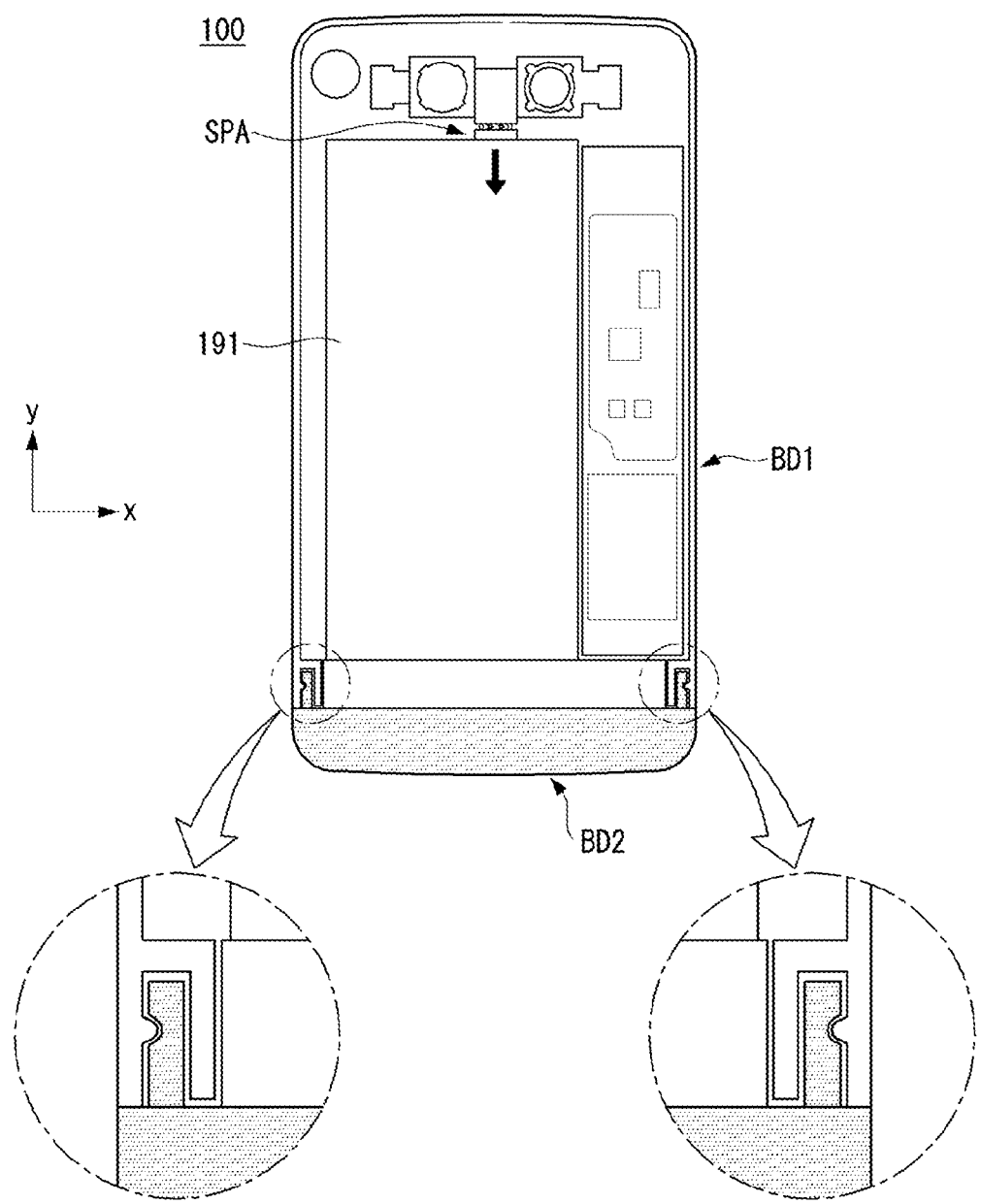

FIG. 20 illustrates a mobile terminal including a plurality of second locking modules in accordance with an embodiment of the invention. For example, two second locking modules LM2 may be respectively positioned on left and right sides of the mobile terminal. Namely, the two second locking modules LM2 may be formed instead of the first locking module LM1.

When the user holds the second body BD2 and applies a force to the mobile terminal 100 in a direction of separating the second body BD2 from the first body BD1, the second locking modules LM2 may be released from the second locking module housing LM2H. Because the second locking module LM2 has simpler configuration than the first locking module LM1, configuration of the mobile terminal 100 including the plurality of second locking modules LM2 instead of the first locking module LM1 may be simpler.

Figure 21:
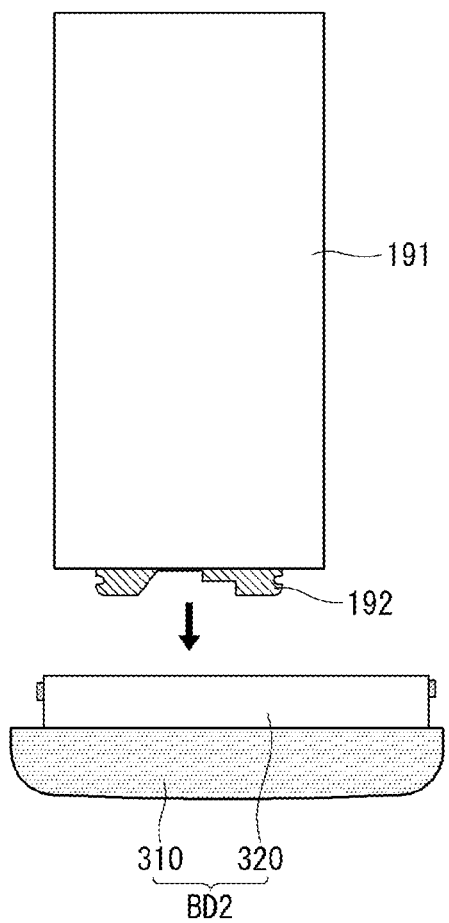
FIGS. 21 and 22 illustrate a coupling relationship between a second body shown in FIG. 1 and a battery.
Figure 22:
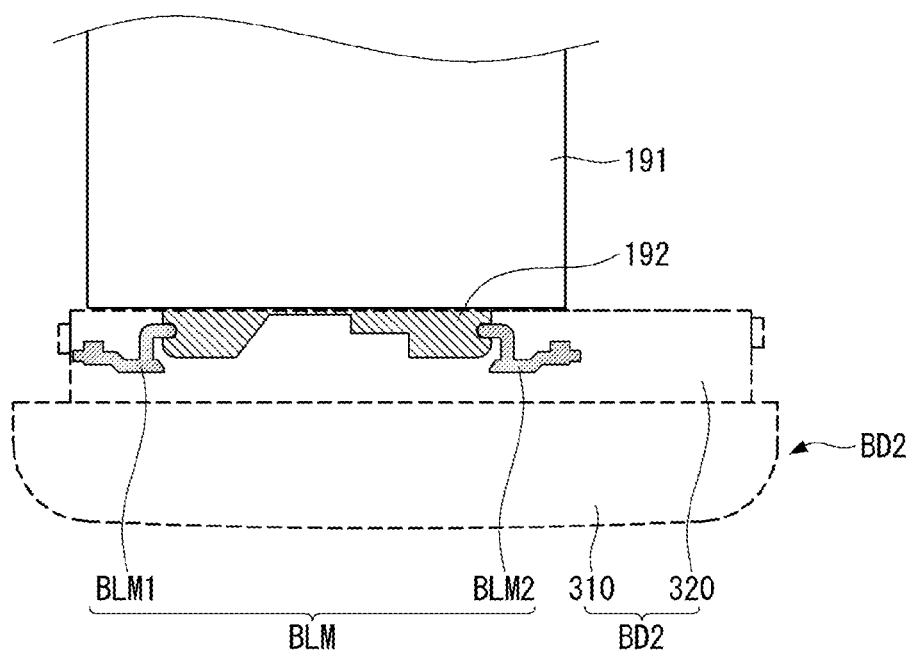

FIGS. 21 and 22 illustrate a coupling relationship between the second body shown in FIG. 1 and the battery.

As shown in FIG. 21, a battery coupling portion 192 may be formed at a lower end of the battery 191. The battery coupling portion 192 may be connected to the second body inner part 320. In other words, the battery 191 may be connected to the second body BD2 through the battery coupling portion 192. The battery coupling portion 192 may include a concave portion at both sides of the battery coupling portion 192. The concave portion of the battery coupling portion 192 is depressed in a direction away from the center of the battery coupling portion 192.

As shown in FIG. 22, the second body inner part 320 may include a battery locking module BLM. The battery locking module BLM may include a first battery locking module BLM1 and a second battery locking module BLM2. Each of the first and second battery locking modules BLM1 and BLM2 may have elasticity. The first and second battery locking modules BLM1 and BLM2 may be inserted into the concave portion of the battery coupling portion 192. The battery coupling portion 192 may be connected to the battery locking module BLM.

FIG. 23 illustrates a state of the mobile terminal according to the embodiment of the invention.

As shown in FIG. 23, the mobile terminal 100 may be in one of a first state, a second state, and a third state.

The first state is a state in which the first and second bodies BD1 and BD2 are fully coupled. In the first state, the battery 191 maintains a state of being electrically connected to the first body BD1. Further, in the first state, the first locking module LM1 is fastened to the eject key EK, and the second locking module LM2 is fastened to the second locking module housing LM2H.

The second state is a state in which the first and second bodies BD1 and BD2 are semi-coupled. In the second state, the battery 191 maintains a state of being electrically connected to the first body BD1. Further, in the second state, the first locking module LM1 is released from the eject key EK, and the second locking module LM2 is fastened to the second locking module housing LM2H.

The third state is a state in which the first and second bodies BD1 and BD2 are separated. In the third state, the battery 191 maintains a state of being electrically disconnected from the first body BD1. Further, in the third state, the first locking module LM1 is released from the eject key EK, and the second locking module LM2 is separated from the second locking module housing LM2H.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a first body including a display and a battery receiving portion that is embedded in the first body and communicates with an opening positioned at an end of the first body;
   a plurality of cameras;
   a camera bracket accommodating the plurality of cameras and coupled to the first body;
   a second body including an inner housing coupled to a side of a battery; and
   a spring assembly positioned in the first body and providing an elastic force for the battery while contacting another side of the battery coupled to the inner housing,
   wherein the first body and the second body are in at least one of states including a first state in which the second body is coupled to the end of the first body, and a second state in which an entire portion of the second body is spaced apart from the end of the first body,
   wherein the spring assembly is coupled to the camera bracket and is positioned between the plurality of cameras.

2. The mobile terminal of claim 1, wherein the inner housing includes:
   a coupling groove formed at a side of the inner housing; and
   a battery locking module positioned in the coupling groove and fastened to a battery coupling portion formed at the side of the battery.

3. The mobile terminal of claim 1, wherein the second body further includes:
   a second circuit board; and
   a connector providing a conductive path between the second circuit board and a main circuit board embedded in the first body.

4. The mobile terminal of claim 1, wherein the battery includes a battery terminal that is positioned at the another side of the battery and supplies electric power to the first body.

5. The mobile terminal of claim 1, wherein the spring assembly provides the elastic force toward the second body.

6. The mobile terminal of claim 1, wherein the spring assembly includes:
   a spring housing;
   at least one spring in the spring housing and providing the elastic force; and
   a pusher connected to the at least one spring and transferring the elastic force from the at least one spring to the second body and the battery.

7. The mobile terminal of claim 1, wherein the states of the first body and the second body further include a third state in which the second body is spaced apart from the first body by the elastic force of the spring assembly, and
   wherein in the third state, the second body is inclined to the end of the first body by a predetermined angle and is spaced apart from the end of the first body.

8. The mobile terminal of claim 7, further comprising an eject key positioned at a side of the first body and releasing a coupling between at least one locking module of the second body and the first body,
   wherein in the third state, a separation distance between the end of the first body and the second body at the side of the first body at which the eject key is positioned, is greater than a separation distance between the end of the first body and the second body at another side of the first body.

9. The mobile terminal of claim 1, further comprising an eject key positioned at a side of the first body and releasing a coupling between at least one locking module of the second body and the first body.

10. The mobile terminal of claim 9, wherein the eject key includes a button and a key shaft extended from the button, and
    wherein the locking module includes a locking button that contacts the key shaft and moves in a longitudinal direction of the key shaft by the key shaft.

11. The mobile terminal of claim 10, wherein when the locking button moves in the longitudinal direction of the key shaft, the state of the first body and the second body changes from the first state to the second state.

12. The mobile terminal of claim 1, wherein the battery is in one of a state in which the battery and the second body are coupled and another state in which a coupling of the battery and the second body is released.

13. The mobile terminal of claim 1, wherein the states of the first body and the second body further include a third state in which the second body is spaced apart from the first body by the elastic force of the spring assembly, and
    wherein in the first and third states, the battery and the first body contact each other and are in an electrically connected state.

14. The mobile terminal of claim 1, wherein the second body further includes an antenna pattern, and
    wherein at least a portion of the antenna pattern overlaps a boundary between the first body and the second body in the first state.

15. The mobile terminal of claim 1, wherein at least a portion of a back surface of the first body is formed of a metal material.

16. The mobile terminal of claim 1, wherein the second body further includes a speaker module and an USB module.

* * * * *